July 22, 1924.
G. TURNER
DRAWN VEHICLE
Filed Aug. 11, 1919
1,502,281
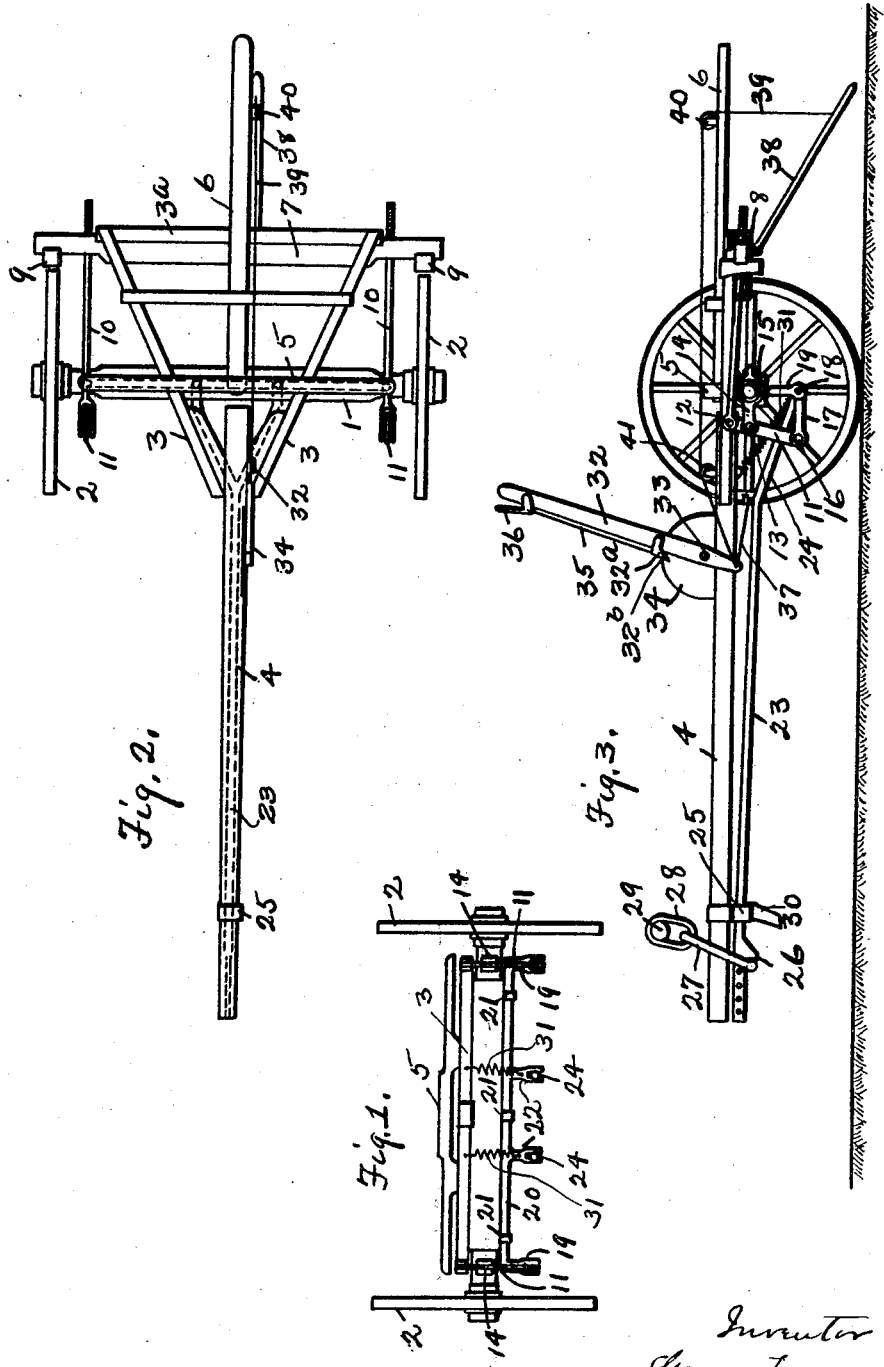

Patented July 22, 1924.

1,502,281

UNITED STATES PATENT OFFICE.

GEORGE TURNER, OF UNION TOWNSHIP, CRAWFORD COUNTY, PENNSYLVANIA.

DRAWN VEHICLE.

Application filed August 11, 1919. Serial No. 316,786.

*To all whom it may concern:*

Be it known that I, GEORGE TURNER, a citizen of the United States, residing in Union Township, in the county of Crawford and State of Pennsylvania, have invented new and useful Improvements in Drawn Vehicles, of which the following is a specification.

The invention is designed to provide a drawn vehicle, ordinarily a wagon, with a brake which is automatically actuated as the vehicle is retarded through the direct action of the horse. While the hold-back pressure usually communicated through the neck yoke on the tongue serves to retard the load to a certain extent this pressure in itself sets the brake so that the actual load on the horse can be made as small as desired. In addition to this the invention involves means for locking the wagon automatically against backward movement. This is particularly desirable in stopping on a hill as it relieves the horse of the load immediately a backward movement of the vehicle takes place.

The invention is illustrated in the accompanying drawings as follows:—

Fig. 1 shows a front view of a front axle of an ordinary wagon, some parts being removed to better show construction.

Fig. 2 a plan view thereof.

Fig. 3 a side elevation.

1 marks the axle, 2 the wheels, 3 the tongue securing frame, 4 the tongue, 5 the front bolster and 6 the reach.

The brake beam 7 is slidingly mounted in the end of the frame 3 by means of straps 8. The beam is provided with the usual shoes 9 which operate directly on the wheels 2 on the front axle 1.

Links 10 extend from the brake beam and are connected by a pin 12 with a lever 11. The lever 11 is pivotally mounted by means of a pin 13 on the post 14. The post 14 is secured to the front axle by a strap 15 extending around the axle. The lever 11 is pivotally connected by means of a pin 16 with a link 17. The link 17 is connected by a pin 18 with a rock arm 19. The rock arm 19 is carried by a rock shaft or bar 20 which is pivotally mounted by means of straps 21 on the underside of the axle 1. Arms 22 extend from the rock shaft 20. A bar 23 extends from the front end of the tongue 4 and has the forked ends 24 which are pivotally connected with the rock arms 22. The front end of the bar 23 extends from a guide 25 secured to the front end of the tongue and a stop 26 is arranged on the bar 23 to engage a ring 27 usually connected to a part of the neck yoke 29 by means of a link 28. The guide 25 preferably has an extension 30 which acts as a safety stop in case of the breakage of the bar 23.

The operation will be readily apparent. As soon as pressure is put on the bar 23 by the back pull on the neck yoke as for example holding back the load on a downgrade this pressure moves the rock arms 22 rearwardly and these operating through the levers and connecting links move the brake beam forward and set the brake. The greater the restraining pressure there is put on the stop 26 the greater pressure is put on the brake so that the horses are relieved of a large part of the effort necessary to restrain the load. It will be noted that the lever 11 is longer below the support 13 than above and this gives an added leverage which is applied to the brakes. This variation in leverage may be varied as desired so that with a given restraining pressure practically any pressure may be delivered to the brakes. As soon as the pressure is released the brakes are returned through the action of a spring 31. This spring extends from the frame 3 to the rock levers 22.

It will be noted that if pressure is exerted on the stop 26 to back the wagon that under these conditions the brake would be set if it were not locked out. I provide for this by a mechanism for locking out the brake. A lever 32 is pivotally mounted at 33 on the tongue and operates over a notched segment 34. It is provided with a pawl $32^a$ operating in a notch $32^b$ on the segment 34 and the pawl is actuated by a rod 35, the rod being actuated by a hand grip lever 36. A cable 37 connects the end of the lever 32 with the bar 23 and when the lever is locked with the bar in its forward position the bar 23 is prevented from moving to the rear and thus setting the brake.

It is desirable also to provide an automatic means for holding the load against backward movement. This is accomplished by a strut 38 which is pivotally mounted on the cross piece $3^a$ of the tongue frame 3. A cable 39 extends from the strut 38 over a pulley 40 on the reach and over a pulley 41 on the tongue. The cable is secured to the lower end of the lever 32.

When the lever 32 is thrown to a forward position permitting the automatic action of the brake the cable 39 is released so that the strut 38 drags on the ground and engages the ground with a backward movement of the vehicle. When, however, the lever 32 is moved to lock out the brake the strut 38 is lifted as clearly shown in Fig. 3.

What I claim as new is:—

In a drawn vehicle, the combination of an axle; wheels on the axle; a draft and guiding bar extending from the axle; a frame on the axle; a brake comprising a beam mounted on the frame operating on said wheels; vertical levers mounted on the axle; links extending from one end of the levers to the brake; a hold-back device carried by the draft and guiding bar; a connection between the hold-back device and the opposite ends of said levers; a hand lever mounted on the guiding bar; means for locking the lever; a connection between the lever and the hold-back device for locking out the brake; a hold-back strut; a connection between the hold-back strut and the hand lever whereby when the brake is locked out the strut is locked out.

In testimony whereof I have hereunto set my hand.

GEORGE TURNER.